United States Patent [19]
Hrovat et al.

[11] Patent Number: 5,576,959
[45] Date of Patent: Nov. 19, 1996

[54] METHOD FOR CONTROLLING YAW OF A WHEELED VEHICLE BASED ON UNDER-STEER AND OVER-STEER CONTAINMENT ROUTINES

[75] Inventors: Davorin D. Hrovat; Minh N. Tran, both of Dearborn, Mich.

[73] Assignee: Ford Motor Company, Dearborn, Mich.

[21] Appl. No.: 398,279

[22] Filed: Mar. 3, 1995

[51] Int. Cl.$^6$ .................................................... G06F 7/70
[52] U.S. Cl. ............................... 364/426.03; 364/426.01; 364/426.02; 303/163; 303/148; 303/146; 303/3; 180/197; 180/248; 180/415; 280/701
[58] Field of Search .................... 364/426.01, 426.02, 364/426.03, 424.05; 303/100, 102, 110, 93, 95, 163, 165, 20, 15, 3, 22.1, 146, 148; 180/197, 412, 415, 408, 422, 248; 280/707, 701, 675, 696

[56] References Cited

U.S. PATENT DOCUMENTS

| | | | |
|---|---|---|---|
| 4,593,955 | 6/1986 | Leiber | 303/148 |
| 4,852,009 | 7/1989 | Jonner et al. | 364/426.02 |
| 4,898,431 | 2/1990 | Karnopp et al. | 303/146 |
| 4,998,593 | 3/1991 | Karnopp et al. | 364/426.02 |
| 5,206,808 | 4/1993 | Inoue et al. | 364/424.05 |
| 5,261,503 | 11/1993 | Yasui | 364/424.05 |
| 5,278,761 | 1/1994 | Ander et al. | 364/426.03 |
| 5,332,300 | 7/1994 | Hartmann et al. | 303/100 |
| 5,371,677 | 12/1994 | Ehret et al. | 364/426.02 |
| 5,386,365 | 1/1995 | Nagaoka | 364/424.05 |
| 5,388,658 | 2/1995 | Ando et al. | 180/197 |
| 5,402,342 | 3/1995 | Ehret et al. | 364/424.05 |
| 5,472,264 | 12/1995 | Klein et al. | 303/3 |
| 5,494,345 | 2/1996 | Inagaki et al. | 303/163 |

*Primary Examiner*—Gary Chin
*Assistant Examiner*—Jacques Louis-Jacques
*Attorney, Agent, or Firm*—Gregory P. Brown; Roger L. May

[57] ABSTRACT

A vehicle yaw control for a vehicle having wheel brakes wherein the wheel brakes complement driver controlled steering efforts by establishing a maximum steering angle that can be used for any given coefficient of friction at the wheel-road interface and for any given speed, thereby achieving optimum lateral control during turning maneuvers by compensating for under-steering and over-steering for each driving condition.

6 Claims, 7 Drawing Sheets

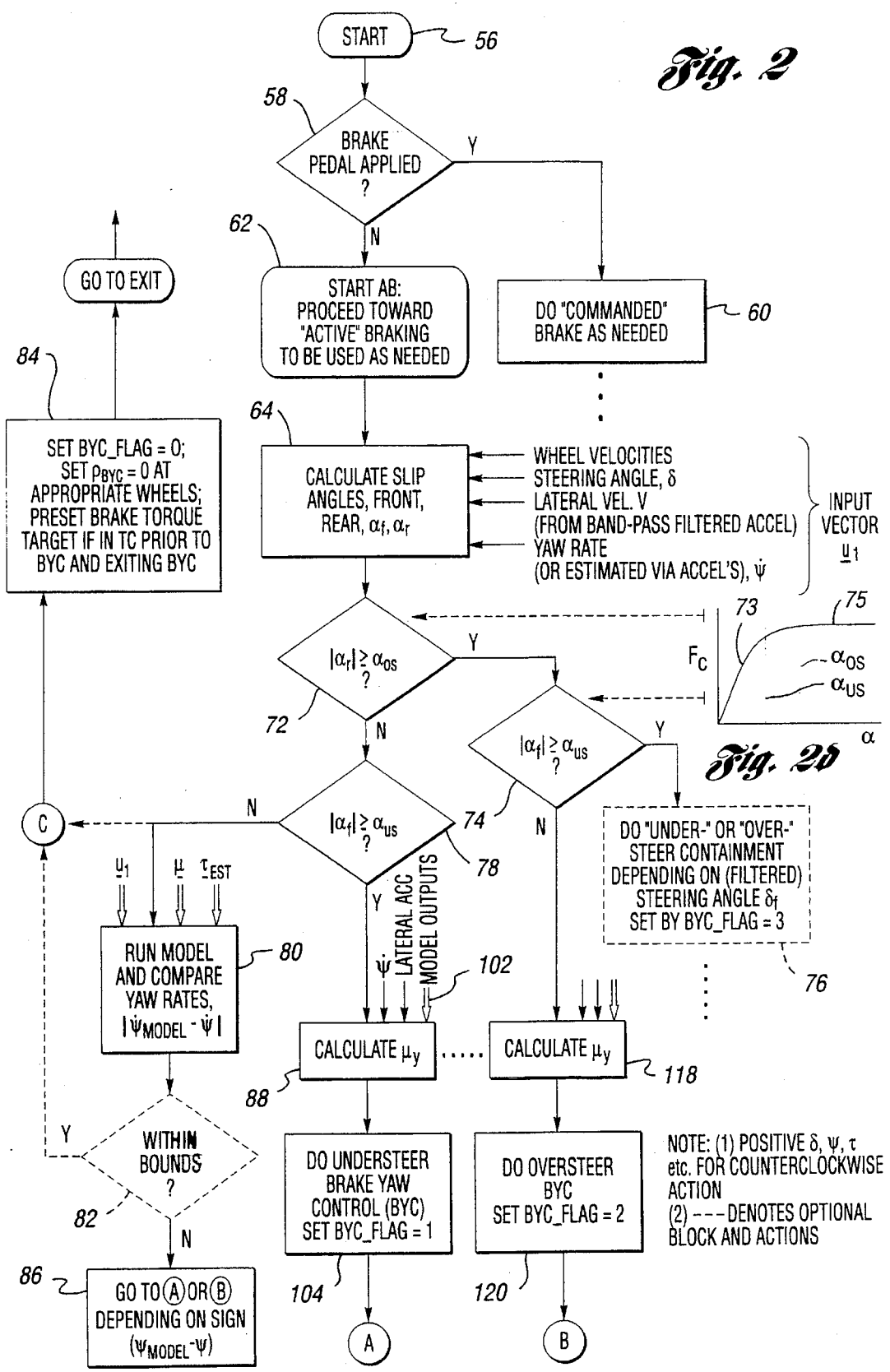

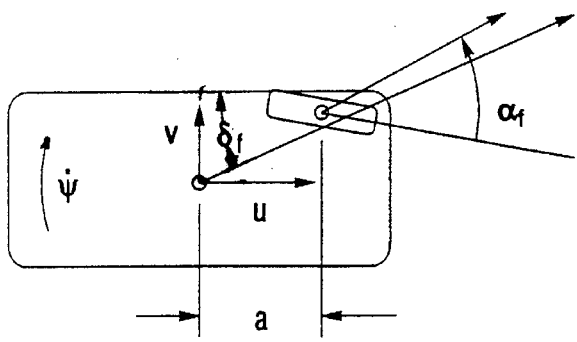
Fig. 2c
Fig. 3
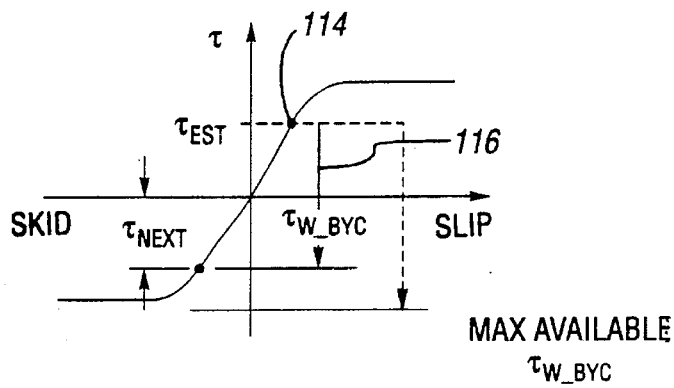
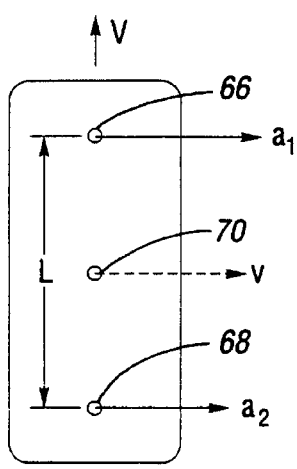
Fig. 4
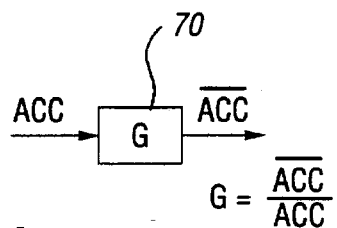
Fig. 4a
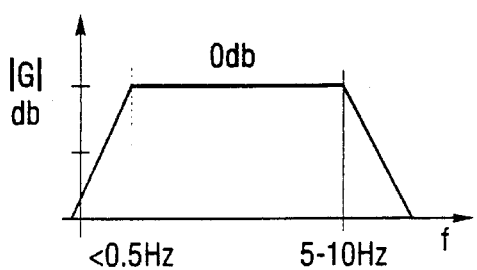
Fig. 4b

METHOD FOR CONTROLLING YAW OF A WHEELED VEHICLE BASED ON UNDER-STEER AND OVER-STEER CONTAINMENT ROUTINES

BACKGROUND OF THE INVENTION

A traction control system for an automotive vehicle may control driving force of the vehicle traction wheels by varying engine torque output or by varying wheel brake pressure. It typically includes a microprocessor that responds to information obtained from wheel speed sensors, a throttle position sensor, and brake actuators. In the case of a vehicle having rear traction wheels and non-driving, steerable front wheels, information on the slip of rear traction wheels is obtained as the speeds of the front and rear wheels are compared.

Although the embodiment described in this application is a rear-wheel-drive vehicle with non-driving front wheels, it will be apparent that our invention will be applicable also to other driveline configurations including front-wheel drive (FWD) vehicles.

In the case of traction control systems using pressure-operated brakes, the microprocessor uses the sensor data to send appropriate signals to the brake actuators to establish the brake control required for the instantaneous vehicle speed, road surface condition and throttle setting. The actuators are designed to suppress wheel slippage by braking the driving wheels in response to commands from the processor. In this way, percentage slip is maintained at an optimum level to maintain the desired traction and lateral stability.

It also is well known in the art to provide antilock brake control to avoid wheel skidding and to maintain vehicle lateral stability while reducing stopping distance. Antilock brake control will effect a high frequency locking and unlocking of the wheels to maintain a desired effective tire/road surface slip ratio. The coefficient of friction between the road surface and the wheel tires varies according to the condition of the road and the characteristics of the tire as well as other factors. The coefficient of friction increases in a generally proportional relationship to the slip ratio up to a point just before the slip coefficient reaches its maximum value. At that point, the relationship between the two variables reverses and the friction coefficient gradually decreases as slip ratio increases.

The lateral force acting on the tires also changes in accordance with slip ratio. The lateral force on the tires is a maximum at zero slip and reaches near-zero when the slip ratio reaches 100 percent. The maximum values for lateral friction coefficient and the coefficient of friction during braking do not occur simultaneously. If, however, brake control or traction control is initiated when the slip ratio is at a value that results in slip coefficient of friction near the maximum value, an adequate compromise is reached that provides sufficient, although not maximum, lateral tire force.

BRIEF DESCRIPTION OF THE INVENTION

Our invention makes use of a strategic application of the brakes on one side of the vehicle or the other using features that are common to the traction control technique and the antilock brake control technique described above.

The improvements of our invention make it possible to develop a yaw torque using wheel brake control, thereby making it possible to achieve lateral stability of the vehicle during turning maneuvers on slippery roads. It is possible to achieve automatic braking maneuvers that act in cooperation with driver-initiated braking maneuvers or that complement driver-initiated steering and driving maneuvers to effectively correct for under-steer and over-steer maneuvers. It achieves under-steer and over-steer containment only in limited critical circumstances, however, and thus avoids unnecessary automatic control intervention that will overrule vehicle control by the operator.

BRIEF DESCRIPTION OF THE DRAWINGS

FIGS. 2, 2a and 2b illustrate a flow diagram of the steps involved in the control strategy for effecting yaw control in a vehicle system of the kind illustrated schematically in FIG. 1.

FIG. 2c is a vector diagram of model vehicle forces, steering angles and slip angles.

FIG. 2d is an empirical plot of the relationship between cornering force and slip angle.

FIG. 3 is a plot of traction/braking wheel torque and wheel slip as well as the limits of traction/braking wheel torque.

FIG. 4 is a schematic diagram of a vehicle represented as a free body for the purpose of yaw rate calculation.

FIG. 4a is a diagram of the effect of passing a yaw rate signal developed by the controller through a high pass filter circuit and a low pass filter circuit.

FIG. 4b is a schematic representation of a transfer function gain circuit.

PARTICULAR DESCRIPTION OF THE INVENTION

Figure 1:
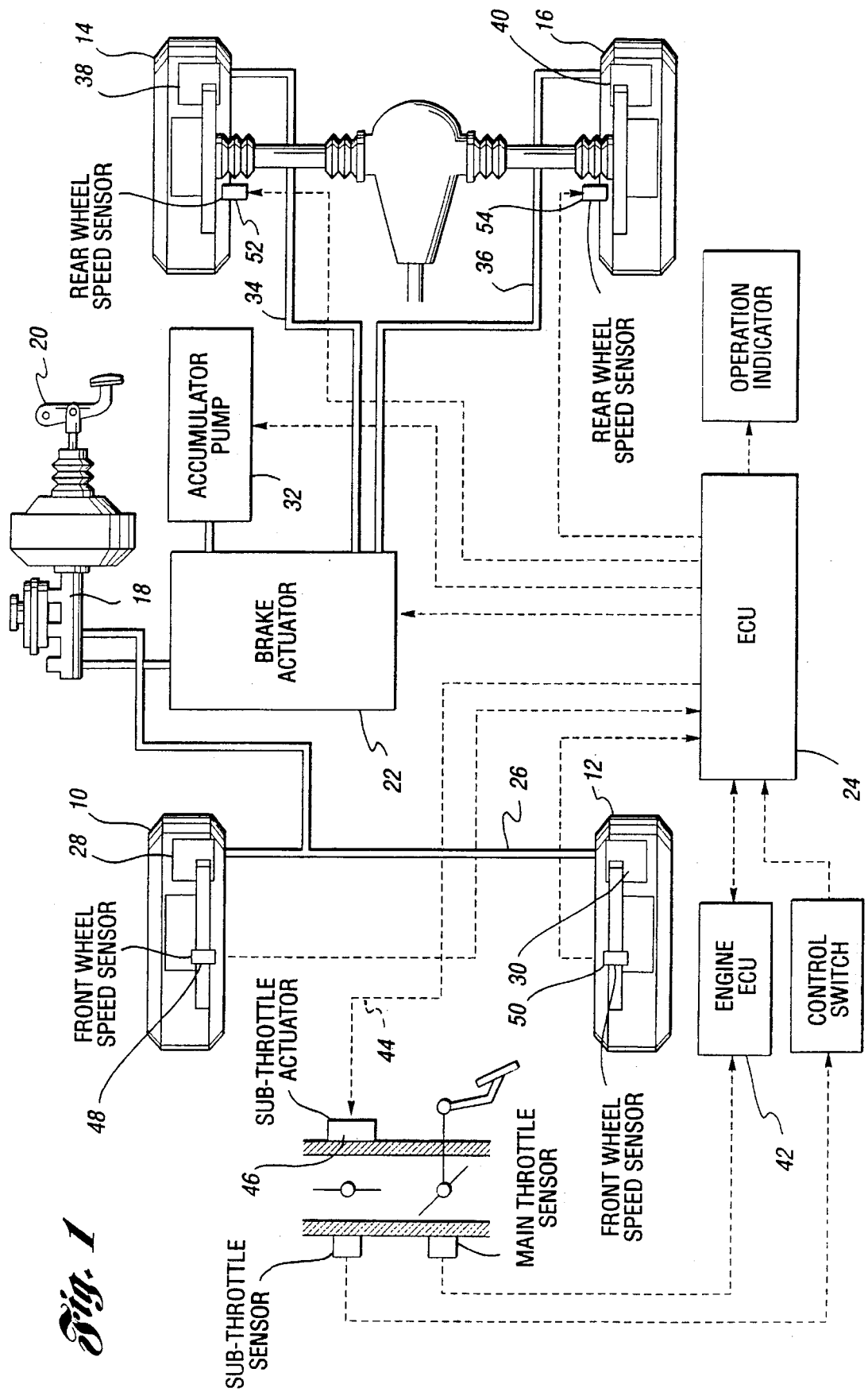
FIG. 1 is a schematic representation of a yaw control system in a rear wheel drive vehicle with dirigible front wheels, each wheel having a wheel brake and a speed sensor, the latter providing wheel speed input information for an electronic processor for effecting yaw control commands.

In FIG. 1, the vehicle system includes front dirigible wheels 10 and 12 and rear traction wheels 14 and 16. A master brake cylinder 18 is under the control of a driver-operated wheel brake pedal 20. A wheel brake actuator 22 under the control of electronic control unit 24 distributes brake actuator pressure through brake line 26 to front wheel brakes for the front wheels as shown at 28 and 30, respectively.

Pressure for the brake actuator 22 is supplied typically by a pump and an accumulator as shown at 32. The brake actuator also supplies brake actuating pressure through rear brake lines 34 and 36 for the rear wheel brakes 38 and 40, respectively.

An engine control unit 42 may be a stand-alone unit, as shown, or it may be a part of the ECU 24. In the embodiment illustrated in FIG. 1, it controls the engine sub-throttle position as well as other engine control variables, as schematically illustrated by the function flow line 44. A sub-throttle actuator 46 may be used to control engine torque during yaw control, or traction control, or antilock brake control if that type of engine torque control is desired. Other engine torque control techniques, however, may be used if that is desired. For example, torque control may be achieved by engine spark timing or by engine fuel rate control. The control of engine torque is not included in the present description of a preferred embodiment of our invention because yaw control achieved by practicing our invention involves primarily the use of the wheel brakes.

Each wheel has a speed sensor that provides speed information for the processor or electronic control unit 24. The speed sensors for the front wheels are shown at 48 and 50. Corresponding wheel speed sensors for the rear wheels are shown at 52 and 54.

A preferred embodiment of our invention will be made with reference to the flow diagram of FIGS. 2, 2a, 2b and 2d.

The controller shown at 24 receives sensor signals and operates on them in accordance with a programmed control strategy, which will be described. The processor has appropriate gates and driver circuits for delivering the output of the operation of the strategy to the respective wheel brakes.

The processor may be a well known microprocessor, sometimes referred to as (EEC), for vehicle driveline control. It includes both a random-access memory and a read-only memory, the latter storing the information comprising the control logic. The result of the computations carried out on the input data by a control processor unit (CPU) is stored in RAM where it can be addressed during each background control loop of the controller. That data can be fetched, erased or changed depending upon the operating conditions of the vehicle. The CPU portion of the controller may comprise an integrated circuit that is distinct from the microprocessor chip that comprises the memory portions. The information that results from the inputting of the sensor data, together with the information that is stored in memory and learned from previous background loops, is used to carry out the control functions.

The routine for yaw control begins at 56 in FIG. 2. The routine proceeds to step 58 where the processor determines whether the brakes for the vehicle are applied or not applied. Usually, this is achieved by detecting whether the brake pedal will trigger the application of vehicle brake lights. If the brakes are applied, the routine will proceed to action block 60, which initiates a commanded brake control routine involving yaw control. This control routine, in effect, would be very similar to the active braking portion of the yaw control routine which is initiated if the inquiry at decision step 58 results in a negative response.

A negative response at step 58 starts the active braking routine, as indicated at action block 62. This routine takes place only in critical driving and handling situations. In order to determine whether critical driving and handling conditions are present and active braking is appropriate, the routine will first detect whether slip angles at the tire/road interface are excessive. If they are not excessive, the active braking routine will not take place, as will be explained subsequently.

Following a determination that active braking may take place, the routine proceeds to action block 64 where slip angles are calculated using as input variables the wheel velocity, the steering angle $\delta$, the lateral velocity of the vehicle v, and the yaw rate ($\psi$). The wheel velocity and the steering angle are variables that are readily measurable. The lateral velocity v can be calculated by using acceleration sensors at the fore and aft locations of the vehicle corresponding to the locations of the front wheels and the rear wheels.

As indicated in FIG. 4, an acceleration term $a_1$ is developed by an acceleration sensor 66. A corresponding acceleration term $a_2$ is obtained using acceleration sensor 68 at the location of the rear wheels. The distance between the sensors 66 and 68 is designated as L, which approximates the distance between the front and rear wheels. The quantity v is equal to the lateral velocity v at the center of mass of the vehicle indicated at 70 in FIG. 4. The integrals of the values $a_1$ and $a_2$ will develop velocity vectors. If the fore and aft acceleration vectors are connected and an acceleration vector is constructed from the center of mass 70 to the construction line connecting the ends of the vectors $a_1$ and $a_2$, the velocity vector v for the center of mass 70 can be determined by simple integration.

The yaw acceleration $a_y$ will equal the derivative of the yaw rate $\psi$ with respect to time, i.e.:

$$a_y = \frac{d_v \dot{\Psi}}{d_t A} = \frac{a_1 - a_2}{L}$$

The yaw rate is equal to $\int a_y dt$+high pass filter and low pass filter outputs G. The output at the high frequency end of the filter circuit is reduced for a gain factor above the frequency of 5–10 Hz in FIG. 4b. The output for low frequencies is reduced for a gain factor lower than 0.5 Hz.

For purposes of this description, the gain factor, as indicated in FIG. 4b, is developed by gain circuit 70 in FIG. 4a and is equal to the ratio of the output acceleration to the input acceleration.

Having completed the calculations at action block 64 in FIG. 2, the routine proceeds to step 72 where the absolute value of the steering angle is compared to a limiting over-steer steering angle, which is determined empirically through test data as indicated in FIG. 2d. The relationship between the lateral coordinate force $F_c$ and rear slip angle is a curve having an initial, fast-rising, generally linear relationship, as shown at 73 in FIG. 2d. It then breaks to a flat relationship as shown at 75 when the limiting slip angle for over-steer $\alpha_{os}$ is reached. The corresponding limiting slip angle for an under-steer condition is represented in FIG. 2d by the value $\alpha_{us}$.

The dynamics of the vehicle are more sensitive to an over-steer condition than to an under-steer condition. That is why the limiting over-steer slip angle shown in FIG. 2d is located to the left of the limiting under-steer slip angle for any given lateral coordinate force.

The slip angle comparison with the slip angle limits indicated in FIG. 2d will determine whether a critical driving and handling situation exists, which could call for introduction of brake yaw control. The limiting tire slip angle at the rear ($\alpha_{os}$) is usually smaller than the front limiting slip angle ($\alpha_{us}$). This is due to the fact that there is greater concern with an over-steer "spin-out" condition than with an under-steer "plow-out" maneuver.

The limiting under-steer slip angle $\alpha_{us}$ and the limiting over-steer slip angle $\alpha_{os}$ are located in the main decision path with respect to the decision of whether to enter the brake yaw control routine. The comparison of the front slip angle with the limiting under-steer slip angle $\alpha_{us}$ occurs in decision block 74 in FIG. 2.

If both of the decisions at decision blocks 72 and 74 are affirmative, the routine will proceed to action block 76 which calls for under-steer or over-steer containment depending on the filtered front steering wheel angle $\delta_f$. A brake yaw control flag BYC_FLAG=3 is set at this time.

If the decision at decision block 72 is negative, the routine will proceed to decision block 78 where the front slip angle $\alpha_{us}$ is compared to the limiting under-steer slip angle $\alpha_{us}$. If the front slip angle $\alpha_f$ is not greater than the limiting slip angle $\alpha_{us}$, an auxiliary decision path will be used to determine whether the control should enter the brake yaw control routine. That additional decision is carried out at action block 80. A theoretical free body vehicle model is effected at action block 80 to compare the target yaw rate ($\psi_{model}$) that would be developed by a theoretical vehicle model with the actual measured vehicle yaw rate ($\psi$). The value for the vehicle yaw rate ($\psi$) is the same yaw rate described previously with respect to action block 64 where yaw rate was determined with reference to the acceleration values of FIGS. 4, 4a and 4b. The input vector $\mu_1$ indicated at 80 in FIG. 2 is an input vector resulting from the input data described previously with reference to action block 64. In addition, the model requires an estimate of the wheel torque and the estimated friction coefficient at the tire/road interface, respectively identified in FIG. 2 by the symbols $\tau_{est}$ and $\mu$.

The value for yaw rate $\psi_{model}$ in FIG. 2 may be calculated as follows:

$$\dot{\psi}_{model} = K_{su}\sqrt{\frac{\hat{\mu}g\delta}{L}},$$

where $K_{su}$ is a surface utilization factor that is determined empirically through test data. For a description of the method for determining estimated wheel torque and estimated surface coefficient that may be used as an input variable for action block 80, reference may be made to U.S. Pat. No. 5,278,761, entitled "METHOD FOR VEHICULAR WHEEL SPIN CONTROL THAT ADAPTS TO DIFFERENT ROAD TRACTION CHARACTERISTICS". That patent is assigned to the assignee of our present invention. The method described in the '761 patent is incorporated herein by reference.

If the yaw rate comparison at action block 80 is within bounds (e.g., ±10%) as determined at decision step 82, the auxiliary routine will exit to point "C" in FIG. 2. The routine then will determine at action block 84 whether traction control at this instant is in place. The brake yaw control flag is set to zero and the brake yaw control pressure $p_{BYC}$ is set at zero at the appropriate wheel, and the brake torque target is preset if traction control is present.

If the difference in the yaw rates measured at action block 80 is not within bounds (for example, ±10%), the routine will proceed as shown at 86 to the under-steer brake yaw control routine or the over-steer brake yaw control routine, respectively, indicated at A or B.

Execution of the vehicle model routine at 80, 82 and 84 will take into account the possibility that there is a split $\mu$ with a corresponding yaw torque containment through steering angle change. This possibility also is taken into account when determining the limiting slip angles $\alpha_{os}$ and $\alpha_{us}$. This prevents a false trigger of the brake yaw control due to, for example, a $\alpha_f$ that is too large because of split $\mu$ operation. Compensation can also be made by detecting wind-gust-induced deviations by using pressure sensors located at the sides of the vehicle or at other appropriate strategic locations. It should be noted that the values for $\alpha_{us}$ and $\alpha_{os}$ can change as a function of the percent slip of the driven wheels.

If the decision at step 78 indicates that the slip angle for the front wheels is greater than the limiting slip angle $\alpha_{us}$, the routine will proceed to action block 88 where $\mu_y$ is calculated. The relationship between front steering angle and cornering force at the front wheels assumes the form shown in FIG. 5a, which corresponds to the relationship described with reference to FIG. 2d. The limiting front slip angle is shown at 90. The point on the plot of FIG. 5a where the estimated $\mu_y$ will occur is indicated by reference numeral 92. Since the weight of the vehicle is known, and since the lateral forces at the front tires and the rear tires can be determined as indicated at 94 and 96 in FIG. 5b, the value for $\mu_y$ can be calculated. The forces $F_{cf}$ and $F_{cr}$, indicated in FIG. 5b, can be determined since the inertia force 98 and the yaw rate moment 100 can be computed. This merely involves treating the vehicle as a free body and setting the sum of the forces acting on the free body equal to zero and setting the sum of the moments acting on the body equal to zero.

The inputs that would be necessary to carry out the calculations at action block 88 in FIG. 2 are the yaw rate, previously determined, and the lateral acceleration, as described earlier. If desired, certain other model outputs can be used, as indicated at 102 in FIG. 2, to take into account variables such as roll, pitch, road grade, etc.

The routine then proceeds from action block 88 to action block 104, and the brake yaw control flag is set to initiate under-steer brake yaw control.

Figure 2A:
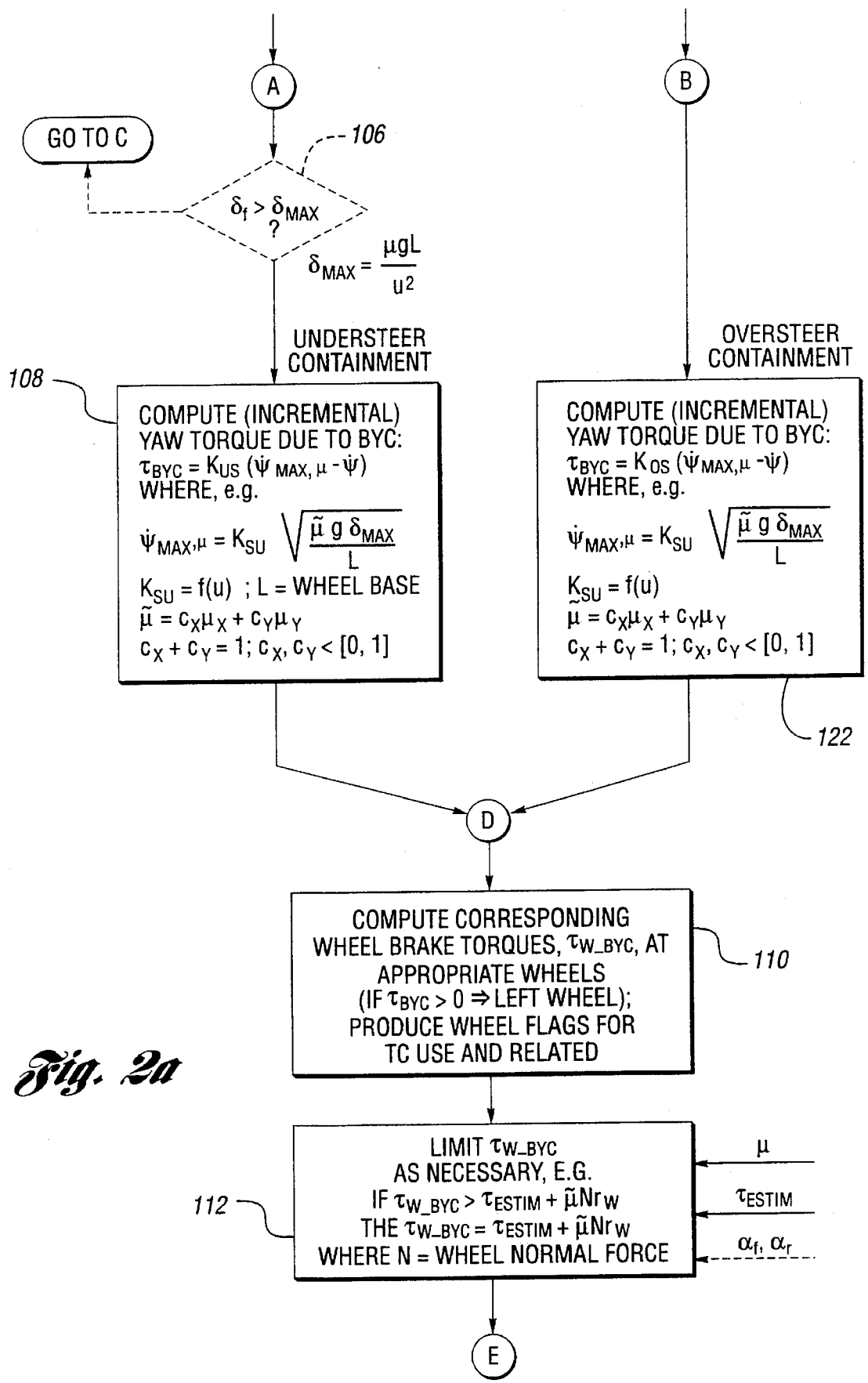

The routine proceeds then to action block 106 in FIG. 2a where the front steering angle $\delta_f$ is compared to the maximum steering angle $\delta_{max}$. The maximum steering angle is computed as follows:

$$\delta_{max} = \frac{\mu g L}{u^2}$$

This steering angle is the maximum steering angle that would be possible for that particular coefficient of friction and for that particular vehicle speed u.

If the front steering angle $\delta_f$ is not greater than the maximum steering angle, the routine then will proceed to point C in FIG. 2 and the under-steer routine will not continue. The test at 106 is an additional (optimal) test to make doubly certain that the under-steer containment routine will not be entered unless it is absolutely necessary because of a critical driving or maneuvering condition. This check is in addition to those previously described to avoid the necessity for removing total control of the vehicle from the operator by using active braking.

The routine then will proceed to the under-steer containment action block 108. At that point, yaw torque due to brake yaw control ($\tau_{BYC}$) is computed, i.e.:

Yaw torque $\tau_{BYC} = K_{su}(\dot{\psi}_{max,\mu} - \dot{\psi})$, where $\dot{\psi}_{max,\mu} =$ $$\dot{\psi}_{max,\mu} = K_{su}\sqrt{\hat{\mu}g\frac{\delta_{max}}{L}}.$$

$K_{su}$ is a constant whose value is empirically determined as a surface utilization factor. Typically, it is a function of speed and vehicle class (e.g., a sports car will have a higher $K_{su}$ than a luxury car). The quantity L equals the wheel base.

The quantity $\mu = c_x\mu_x + c_y\mu_y$. The values $c_x$ and $c_y$ are empirical factors that reflect a confidence level that is gained from test experience. The quantity $\mu$ is a combined value and is calculated in accordance with the method described previously and in U.S. Pat. No. 5,278,761, previously mentioned.

The surface utilization factor provides a certain safety margin, which is ≦1. It depends on the vehicle speed so that lower values of utilization factor, in general, result in higher coefficients of friction μ. Typically, it may be about 0.8.

The surface friction coefficient μ is calculated as a weighted combination or a combined μ that takes into account longitudinal $\mu_x$ and lateral $\mu_y$ estimates. The corresponding weights $a_x$ and $a_y$ are adjusted depending upon confidence levels in $\mu_x$ and $\mu_y$.

It is the object of the routine for calculating $\delta_{max}$ to obtain the maximum curvature for a given vehicle speed and for a given road surface coefficient. This approach provides the least amount of intervention in the control of the vehicle by the operator.

After the desired brake yaw torque has been calculated, as explained above, it would be implemented as shown in the routine in FIG. 2a below point D. At action block 110 following point D in FIG. 2a, a routine is carried out to avoid locking in the wheels due to the combined μ. If wheel locking is detected, a flag can be set at that point to establish traction control routines. In the alternative, a processor using wheel speed sensor data can observe whether the wheels are tending to lock up, and then an appropriate change or updating of the surface μ coefficient can be made as needed. This is done at action block 112 where the torque at the wheels $\tau_{w\_BYC}$ due to brake yaw control is limited if necessary. For example, the torque of the wheels would be limited if it is greater than the estimated torque plus the combined μ times the normal force times the loaded, effective radius of the wheel $r_w$. Thus, $\tau_{w\_BYC}$ is limited if more wheel torque exists than the road surface can tolerate.

The input variables for carrying out the operations at action block 112 are μ, estimated torque $\tau_{est}$ and the front and rear slip angles ($\alpha_f$, $\alpha_r$). As indicated in FIG. 3, the estimated torque is a stored value that represents the current torque.

Figure 5:
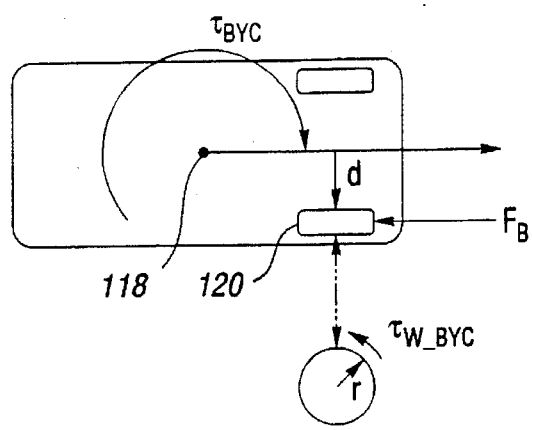
FIG. 5 is a diagram of the forces and the torques applied to a vehicle model and to the vehicle wheels of the model.
Figure 5A:
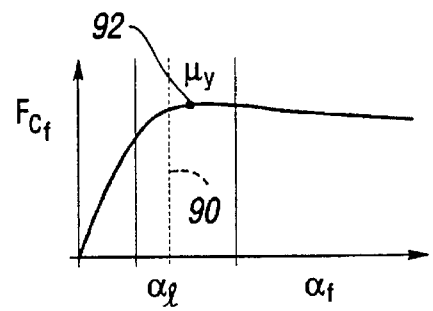
FIG. 5a is a plot of the lateral force on a traction wheel versus slip angle showing the limiting slip angle for maximum slip coefficient of friction.
Figure 5B:
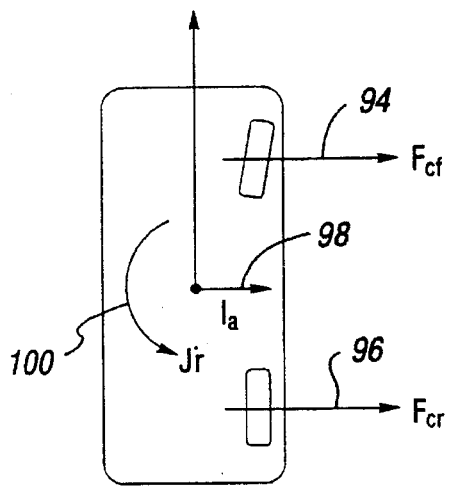
FIG. 5b is a diagram of the cornering forces acting on a vehicle model subjected to yaw torque.

A plot of the percent slip at the tire/road interface and the torque is shown in FIG. 3. The estimated torque during slipping in the upper right-hand quadrant of the plot of FIG. 3 is indicated at 114. The maximum available incremental braking torque of the wheels is shown at 116 in FIG. 3. It is computed as shown in block 112 of FIG. 2a. In FIG. 5, the distance between the center of mass of the vehicle 118 and the wheel 120 is equal to the quantity d. The braking force on the wheel is indicated in FIG. 5 by the symbol $F_B$. The torque $F_B \cdot \tau = \tau_{w\_BYC}$. The effective radius of the wheel indicated in FIG. 5 is equal to r. Torque $\tau_{w\_BYC}$ then equals:

$$\tau_{w\_BYC} = r/d \tau_{BYC}$$

The quantity $\tau_{next}$ in FIG. 3 is determined after calculating $\tau_{w\_BYC}$. The value $\tau_{next}$, then, is the target torque value that would be ideally present. It would be used during the next background loop of the microprocessor.

Referring again to FIG. 2, if the decision at step 74 indicates that the slip angle at the front wheels ($\alpha_f$) is greater than the limiting slip angle ($\alpha_{us}$), either under-steer or over-steer containment takes place depending on the filtered steering angle at the front wheel $\delta_f$. If the comparison at 74 is negative, $\mu_y$ is calculated as indicated at action block 88 using the same input variables. This is done at action block 118. The over-steer containment routine then takes place, as indicated at action block 120. This involves calculation of $\tau_{BYC}$ at action block 122, which duplicates the calculations described with reference to action block 108.

FIG. 2c shows a diagram of a free body that includes vector representations for lateral velocity (v), vehicle forward velocity (u) and steering angle $\delta_f$. Using these variables, the slip angle for the front wheels can be calculated in accordance with the following equation:

$$\alpha_f = \delta_f - \tan^{-1}\left(\frac{v + \dot{\Psi} \cdot a}{u}\right)$$

In FIG. 2c, the slip angle at the front wheels is the angle between the direction of travel and the angle of the plane of the front wheels. The quantity "a" is the distance between the center of mass of the vehicle and the front wheels.

Figure 2B:
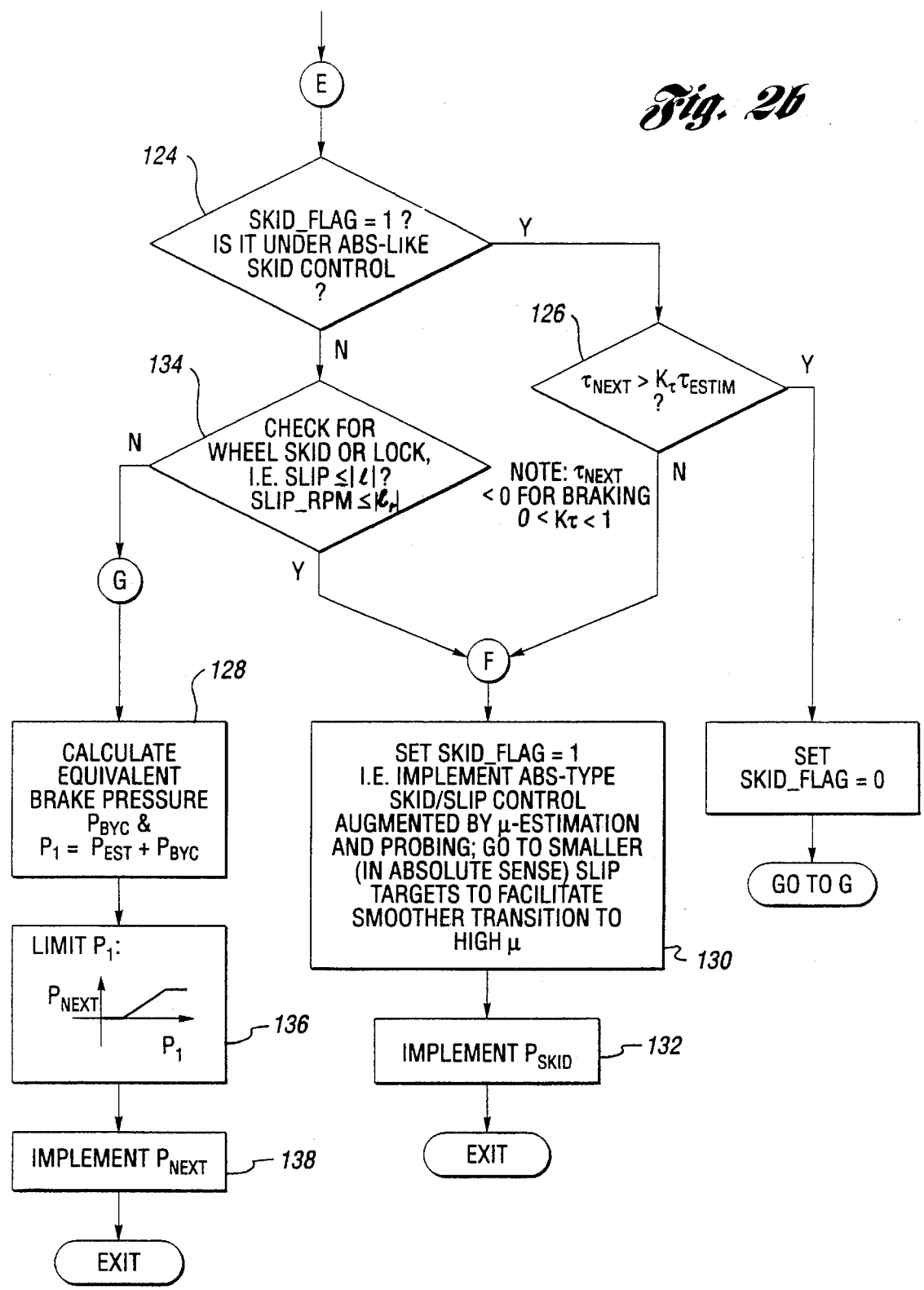

The strategy routine in FIG. 2b takes into account the situation that exists if brake yaw control action is needed while the relevant wheels are under traction control. At the instant brake yaw control is first requested, the traction control on the affected wheel will stop and an appropriate flag will be set to indicate this. The brake torque corresponding to traction control will be memorized and stored in a register of the computer memory. Thus any brake yaw control torque will be acting in addition to this residual traction control torque.

At block 124, a check is made if the given wheel is under ABS-like control, which is indicated by the SKID-Flag being equal to "1". If the ABS-like control flag is set, a decision is made at step 126 to determine whether $\tau_{next}$ is greater than the estimated torque taking into account a multiplier $K_\tau$. If the value $\tau_{next}$ is not greater than the enhanced estimated torque at 126, the ABS skid flag set at 124 is now set at 130 to zero and the routine proceeds to action block 128, which will be explained subsequently. If the inquiry at step 126 is negative, the routine will proceed to point F indicated in FIG. 2b, which results in the calculations indicated in action block 130. The ABS skid flag is set, which indicates that the skid control is in effect as augmented by μ estimation calculations. At this stage, smaller slip targets are chosen to facilitate smoother transitions to high μ road surfaces. The engine powertrain slip target will be set to the average of the target of the wheel not under brake yaw control (assuming that this wheel is under traction control), and the actual slip of the wheel that is under the yaw control.

The input variables for the calculations that occur at action block 130 are the yaw rate ($\dot{\psi}$), the wheel speed and the friction coefficient μ discussed with reference to the model described at action block 80. The skid control pressure $p_{skid}$ is implemented at action block 132.

If the inquiry at step 124 is negative, a check then is made to make certain that the controlled wheel is neither starting to skid nor locked. If the check at 134 is positive, the routine will proceed as described previously with reference to action block 130. A negative inquiry at 134 will cause the routine to proceed to point "G" which will initiate the calculation at action block 128 where equivalent brake pressure $p_1$ is determined. That pressure is equal to the estimated pressure $p_{est}$+the pressure for brake yaw control $p_{BYC}$. The magnitude of the equivalent pressure indicated at action block 128 can be truncated or limited to a calibrated value, and that value can be used during the next background loop as the target or desired pressure $P_{next}$. This is shown by the diagram included within action block 136. After limiting the equivalent pressure to a calibrated value, the brake yaw control pressure $p_{next}$ is implemented as shown at action block 138.

The estimated brake pressure $p_{est}$ shown in action block 128 can be obtained using a routine described in U.S. patent application Ser. No. 08/329,928, filed Oct. 27, 1994, which is assigned to the assignee of our present invention. The disclosure of that copending application is incorporated herein by reference.

The pressure that produces the value $\tau_{w\_BYC}$ is the value $p_{BYC}$ as indicated at action block 128. That pressure is computed as follows (see FIG. 5):

$$F_B \cdot d = \tau_{BYC} \tag{1}$$

$$F_b \cdot r = \tau_{w\_BYC} \tag{2}$$

$$\tau_{w\_BYC} = \frac{r}{d} \tau_{BYC} \tag{3}$$

$$p_{BYC} = \frac{\tau_{w\_BYC}}{K_{\tau p}}, \tag{4}$$

where $K_{\tau p}$ is an empirical value determined by the relationship between pressure and wheel torque.

Figure 6:
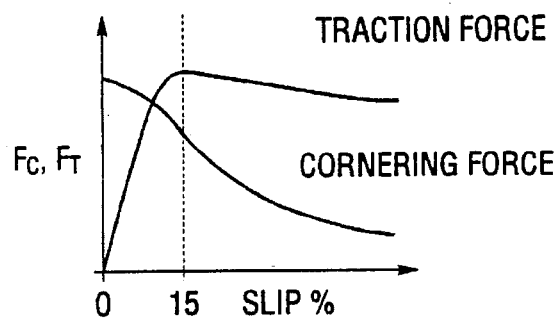
FIG. 6 is a plot of traction forces and cornering forces versus slip for a wheeled vehicle.

FIG. 6 shows a plot of the typical relationships between traction force and cornering force as a function of percent slip. The cornering force decreases continuously from a zero value of slip to a maximum value of slip whereas the traction force increases until the slip reaches a value of approximately 10–20 percent. If a target slip value is chosen at a point corresponding to a maximum traction force, the cornering forces still are adequate to maintain lateral vehicle stability. It will be possible, however, to use an approach that favors the cornering forces. That would mean a lower percent slip target with increasing steering angle, while taking into account the limiting surface utilization factors described previously with reference to action block 108.

Figure 7:
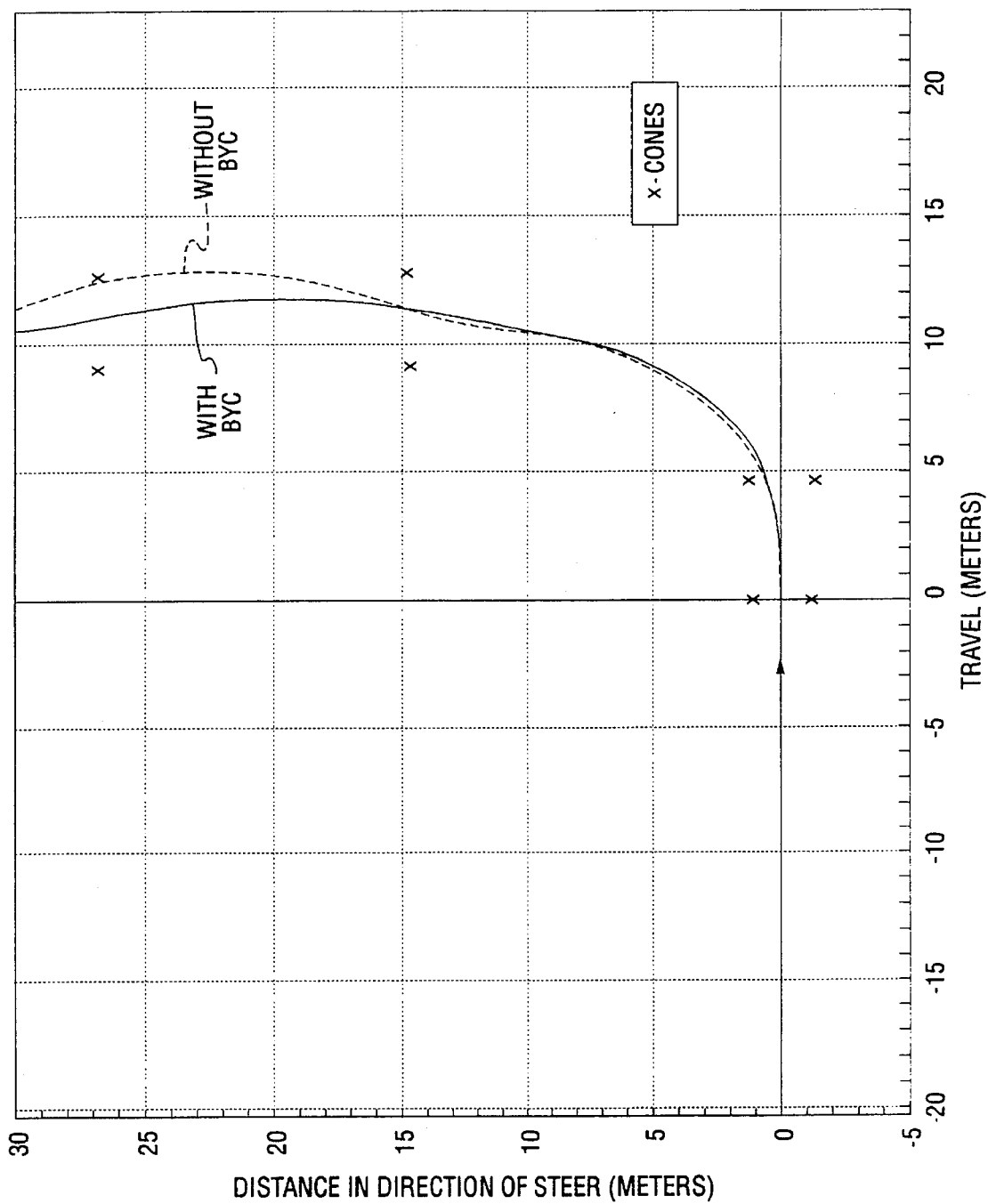
FIG. 7 is a plot of the path of travel of a test vehicle on an icy road, both with brake yaw control and without brake yaw control.

Shown in FIG. 7 is a chart that indicates the path of a test vehicle with brake yaw control and a comparison of that path with the path that would be followed by the same vehicle without brake yaw control. The maneuver indicated in FIG. 7 is a left turn maneuver on ice. The path followed by the vehicle under brake yaw control is shown with a full line, and the path followed by the vehicle without brake yaw control is shown with a dotted line. The steering test cones are indicated in FIG. 7 with "X" marks.

As seen in FIG. 7, the vehicle follows a path through four pairs of steering test cones. At the location of the fourth pair of cones, the vehicle without brake yaw control will strike the right-hand cone of the fourth pair of cones.

The vehicle with brake yaw control was found to be more stable and could be driven at a higher average speed without loss of lateral control. Similar trends can be observed during lane changing steering maneuvers on ice.

Having described a preferred embodiment of our invention, what we claim and desire to secure by U.S. Letters Patent is.

What is claimed is:

1. A method for automatically controlling yaw for a road vehicle having front steerable wheels and rear wheels, each of said wheels having a wheel brake and a wheel speed sensor, said vehicle having lateral acceleration sensors at front and rear locations on said vehicle and a steering wheel angle sensor, said method comprising the steps of:

calculating lateral velocity of said vehicle as an integral of lateral acceleration sensor data;

calculating actual yaw rate based upon lateral acceleration sensor data;

calculating slip angle at least at said front wheels based upon wheel velocity sensed by said wheel speed sensors for said front wheels, steering angle, lateral velocity and said actual yaw rate;

comparing the calculated slip angle with a stored, empirical, limiting value of slip angle for under-steer conditions;

calculating estimated friction coefficient at the road surface engageable by said front wheels if said calculated slip angle is greater than said limiting value for under-steer conditions;

calculating desired yaw torque on said vehicle;

calculating wheel brake torque at said front wheels;

limiting wheel brake torque to a predetermined maximum value for a given road surface coefficient of friction whereby an under-steer yaw containment routine for said vehicle is effected;

controlling torque at said rear wheels following said step of comparing said slip angle with said stored value; and calculating target yaw rate based upon said road surface coefficient of friction, and exiting said under-steer yaw containment routine if the difference between said target yaw rate based upon said road surface coefficient of friction and said actual yaw rate is less than a predetermined value.

2. The method as set forth in claim 1 including the step of calculating the desired target torque at said front wheels based upon said input data of said sensors, storing said desired yaw torque and and limiting torque at said wheels due to yaw control to a predetermined value that is a function of estimated friction coefficient and normal wheel load.

3. A method for automatically controlling yaw for a road vehicle having front steerable wheels and rear wheels, each of said wheels having a wheel brake and a wheel speed sensor; said vehicle having a lateral acceleration sensor at front and rear locations on said vehicle, said method comprising the steps of:

calculating lateral velocity of said vehicle as an integral of lateral acceleration sensor data;

calculating actual yaw rate based upon lateral acceleration sensor data;

calculating slip angle at least at said rear wheels based upon wheel velocity sensed by said wheel speed sensors for said rear wheels, steering angle, lateral velocity and said actual yaw rate;

comparing the calculated slip angle with a stored, empirical, limiting value of slip angle for over-steer conditions;

calculating estimated friction coefficient at the surface of said road engageable by said rear wheels if said calculated slip angle is greater than said limiting slip angle for over-steer conditions;

calculating desired yaw torque on said vehicle;

calculating wheel brake torque at said front wheels;

limiting wheel brake torque by a predetermined maximum value for a given road surface coefficient of friction whereby an over-steer yaw containment routine for said vehicle is effected;

controlling torque at said front wheels following said step of comparing said slip angle with said stored value; and calculating target yaw rate based upon said road surface coefficient of friction and exiting said over-steer yaw containment routine if the difference between said target yaw rate based upon said road surface coefficient of friction and said actual yaw rate is less than a predetermined value.

4. The method as set forth in claim 3 including the step of calculating desired target torque at said front wheels based upon said input data of said acceleration sensors, storing said desired yaw torque and limiting torque at said wheels due to yaw control to a predetermined value that is a function of estimated friction coefficient and normal wheel load.

5. A method for automatically controlling yaw for a road vehicle having front steerable wheels and traction wheels, each of said wheels having a wheel brake and a wheel speed sensor and said vehicle having a sensor for determining yaw rate, said method comprising the steps of:

calculating lateral velocity based on sensor data obtained from said sensors;

calculating slip angle at least at said steerable wheels based upon wheel velocity sensed by said wheel speed sensors for said front wheels, steering angle, lateral velocity and yaw rate;

comparing the calculated slip angle with a stored, empirical, limiting value of slip angle for under-steer conditions;

calculating friction coefficient at the road surface engageable by said front wheels if said slip angle is greater than said limiting value for under-steer conditions;

calculating desired yaw torque on said vehicle;

calculating wheel brake torque at said front wheels;

limiting wheel brake torque to a predetermined maximum value for a given road surface coefficient of friction whereby an under-steer yaw containment routine for said vehicle is effected;

controlling torque at said traction wheels following said step of comparing said slip angle with said stored value; and calculating target yaw rate based upon said road surface coefficient of friction, and exiting said under-steer yaw containment routine if the difference between said target yaw rate based upon said road surface coefficient of friction and said actual yaw rate is less than a predetermined value.

6. A method for automatically controlling yaw for a road vehicle having front steerable wheels and traction wheels, each of said wheels having a wheel brake and a wheel speed sensor and said vehicle having a sensor for determining yaw rate, said method comprising the steps of:

calculating lateral velocity based on sensor data obtained from said sensors;

calculating slip angle at least at said steerable wheels based upon wheel velocity sensed by said wheel speed sensors for said front wheels, steering angle, lateral velocity and yaw rate;

comparing the calculated slip angle with a stored, empirical, limiting value of slip angle for over-steer conditions;

calculating friction coefficient at the road surface engageable by said traction wheels if said slip angle is greater than said limiting value;

calculating desired yaw torque on said vehicle;

calculating wheel brake torque at said front wheels;

limiting wheel brake torque to a predetermined maximum value for a given road surface coefficient of friction whereby an over-steer yaw containment routine for said vehicle is effected;

controlling torque at said front wheels following said step of comparing said slip angle with said stored value; and calculating target yaw rate based upon said road surface coefficient of friction and exiting said over-steer yaw containment routine if the difference between said target yaw rate based upon said road surface coefficient of friction and said actual yaw rate is less than a predetermined value.

* * * * *